(12) United States Patent
Herud

(10) Patent No.: US 7,914,010 B2
(45) Date of Patent: Mar. 29, 2011

(54) HYDRAULIC EXPANSION CHUCK FOR CHUCKING A TOOL, SUCH AS A BORING TOOL, MILLING CUTTER, OR OTHER CUTTING TOOL

(75) Inventor: Josef K. Herud, Herzogenaurach (DE)

(73) Assignee: Kennametal Inc., Latrobe, PA (US)

( * ) Notice: Subject to any disclaimer, the term of this patent is extended or adjusted under 35 U.S.C. 154(b) by 1095 days.

(21) Appl. No.: 11/537,142

(22) Filed: Sep. 29, 2006

(65) Prior Publication Data

US 2007/0145692 A1   Jun. 28, 2007

Related U.S. Application Data

(63) Continuation-in-part of application No. PCT/EP2005/003048, filed on Mar. 22, 2005.

(30) Foreign Application Priority Data

Apr. 3, 2004   (DE) ..................... 20 2004 005 321 U

(51) Int. Cl.
*B23B 31/30* (2006.01)

(52) U.S. Cl. .............. 279/4.06; 279/4.03; 279/4.11; 279/156

(58) Field of Classification Search .............. 279/4.01, 279/4.03, 4.06, 4.11, 156; B23B 31/30
See application file for complete search history.

(56) References Cited

U.S. PATENT DOCUMENTS

| | | | | | |
|---|---|---|---|---|---|
| 2,567,471 | A | * | 9/1951 | Collgert et al. | 279/4.03 |
| 2,815,682 | A | * | 12/1957 | Kolbe et al. | 74/603 |
| 2,826,420 | A | * | 3/1958 | Klingler | 279/4.03 |
| 3,034,408 | A | * | 5/1962 | Kampmeier | 409/231 |
| 3,250,542 | A | * | 5/1966 | Winnen et al. | 279/2.08 |
| 3,378,902 | A | * | 4/1968 | Hoexter | 492/4 |
| 3,388,917 | A | * | 6/1968 | Winnen et al. | 279/4.03 |
| 3,516,681 | A | * | 6/1970 | Cox et al. | 279/4.02 |
| 3,542,354 | A | * | 11/1970 | Fitzpatrick | 269/22 |
| 3,592,482 | A | * | 7/1971 | Better et al. | 279/4.06 |
| 3,602,521 | A | * | 8/1971 | Uhtenwoldt et al. | 279/4.06 |
| 3,679,219 | A | * | 7/1972 | Cameron | 279/4.03 |
| 3,719,367 | A | * | 3/1973 | Baturka | 279/145 |
| 4,781,390 | A | * | 11/1988 | Steinberger et al. | 279/4.02 |
| 4,958,969 | A | * | 9/1990 | Och | 409/234 |
| 5,030,048 | A | * | 7/1991 | Massa | 409/234 |

(Continued)

FOREIGN PATENT DOCUMENTS

DE   3417430 A1 * 11/1985

(Continued)

OTHER PUBLICATIONS

International Search Report PCT/EP2005/003048 and English translation thereof.

*Primary Examiner* — Eric A Gates
(74) *Attorney, Agent, or Firm* — Larry R. Meenan

(57) ABSTRACT

A hydraulic expansion chuck for chucking a tool such as a boring tool, a milling cutter, or other cutting tool. The hydraulic expansion chuck has an expansion bushing which can be deformed radially under the action of a pressure fluid contained in a pressure chamber to chuck a tool. Pressure is transmitted to the pressure chamber from a pressure generating unit via an annular gap positioned about the chuck axis.

20 Claims, 2 Drawing Sheets

U.S. PATENT DOCUMENTS

| | | | |
|---|---|---|---|
| 5,088,746 A * | 2/1992 | Dietz et al. | 279/4.06 |
| 5,286,042 A * | 2/1994 | Laube | 279/133 |
| 5,301,962 A * | 4/1994 | Killinger et al. | 279/105.1 |
| 5,462,293 A * | 10/1995 | Samelius et al. | 279/4.03 |
| 5,516,243 A * | 5/1996 | Laube | 408/239 R |
| 6,179,530 B1 | 1/2001 | Retzbach et al. | |
| 6,311,987 B1 * | 11/2001 | Rinne et al. | 279/4.03 |
| 6,488,285 B1 * | 12/2002 | Allard | 279/4.03 |
| 6,938,903 B1 * | 9/2005 | Haimer | 279/4.03 |
| 2005/0184472 A1 * | 8/2005 | Huijbers et al. | 279/4.01 |

FOREIGN PATENT DOCUMENTS

| | | |
|---|---|---|
| DE | 93 05 704 U1 | 7/1993 |
| DE | 94 11 260 U1 | 10/1994 |
| EP | 0 991 872 A | 4/2000 |
| WO | WO 9426448 A1 * | 11/1994 |
| WO | WO 95/29029 A | 11/1995 |
| WO | WO 98/39123 A | 9/1998 |
| WO | WO 98/46896 A | 10/1998 |
| WO | WO 02/070177 A | 9/2002 |
| WO | WO 02070177 A2 * | 9/2002 |

* cited by examiner

HYDRAULIC EXPANSION CHUCK FOR CHUCKING A TOOL, SUCH AS A BORING TOOL, MILLING CUTTER, OR OTHER CUTTING TOOL

CONTINUING APPLICATION DATA

This application is a Continuation-In-Part application of International Patent Application No. PCT/EP2005/003048, filed on Mar. 22, 2005, which claims priority from Federal Republic of Germany Patent Application No. 20 2004 005 321.7, filed on Apr. 3, 2004. International Patent Application No. PCT/EP2005/003048 was pending as of the filing date of this application. The United States was an elected state in International Patent Application No. PCT/EP2005/003048.

BACKGROUND

1. Technical Field

The present application relates to a hydraulic expansion chuck for chucking a tool, in particular a boring tool or milling cutter.

2. Background Information

An expansion chuck is used to connect a tool that is driven in rotation with the drive spindle of a machine tool. For this purpose an expansion chuck has a pronounced expansion chuck axis around which the expansion chuck and the tool clamped in it are driven in rotation. In the direction of this expansion chuck axis, an expansion chuck always has a tool-side end which is provided to hold the tool, and a machine-side end, which is realized so that it forms a connection between the expansion chuck and the drive spindle of the machine tool. Hydraulic expansion chucks form a genre of expansion chucks that is described in the prior art. On an expansion chuck of this type, the receptacle for the tool is formed by a thin-walled expansion bushing. The expansion bushing is surrounded by a pressure chamber which is filled with a pressure fluid, such as an oil, for example. The expansion chuck is then realized so that when pressure is applied to the pressure fluid, the expansion bushing is elastically deformed radially and thereby chucks the tool that is being used in place. One of the advantages of a hydraulic expansion chuck is that in operation, it damps any vibrations and impacts that occur. This property makes it possible to achieve a particularly high surface quality during the machining and a long useful life of the tool.

WO 03/095132 A1 describes a hydraulic expansion chuck of this type. On this expansion chuck of the prior art, the pressure chamber is realized between an expansion bushing which is realized in one piece with a base body and a chucking ring which is screwed onto the base body. By screwing or unscrewing the chucking ring with respect to the base body, the volume of the pressure chamber can thereby be reduced or increased, and the pressure fluid can thereby be pressurized or depressurized.

In contrast to the chuck described above, on an expansion chuck there is frequently a pressure generating unit, e.g. on that is realized in the form of a piston-cylinder unit, which is axially offset toward the tool-side end with respect to the pressure chamber and the expansion bushing. An expansion chuck of this type is described in WO 98/39123 A1, for example. For the transmission of the pressure from the pressure generating device into the pressure chamber, on this expansion chuck an oil conducting system is provided, which consists of narrow connecting borings that are introduced into the material of which the expansion chuck is made.

An expansion chuck which is pushed onto a drive shaft with an expansion bushing that can chuck both radially outwardly and radially inwardly is also known from German Patent No. 743 530 C.

In particular in mold and die construction, very long and narrow expansion chucks are required. Conventional expansion chucks, however, can no longer be constructed in such long and narrow designs or only with considerable expense and at considerable effort. For example, on a particularly narrow expansion chuck a movable chucking ring, e.g. of the type described in WO 03/095132 A1, can no longer be installed for space reasons. Likewise a connecting boring, e.g. of the type described in WO 98/39123 A1 to transmit the pressure, can no longer be used on account of the thin walls of a narrow expansion chuck or can only be realized with a great deal of effort. As the length of the expansion chuck increases, the technical effort required to introduce a correspondingly longer connecting boring also increases drastically. An additional problem results from the fact that, when pressure is applied, stresses are introduced into the material of the expansion chuck also in the vicinity of each connecting boring, which can lead to a significant bending of the expansion chuck and thus have an adverse effect on the true or concentric running of the tool.

OBJECT OR OBJECTS

An object of the present application is therefore to indicate a hydraulic expanding clutch which can be realized with comparatively little effort and expense in a long and narrow shape, and is also characterized by advantageous properties in operation.

SUMMARY

At least one possible embodiment teaches that this object is accomplished by the hydraulic expansion chuck with an expansion bushing on its tool-side end and surrounded by a pressure chamber, which expansion bushing can be deformed radially under the action of a pressure fluid that is contained in the pressure chamber to chuck a tool, with a pressure generating unit that is at some distance axially with respect to a chuck axis of the expansion bushing and a pressure conduction system for the transmission of pressure from the pressure generating unit to the pressure chamber, wherein the pressure conduction system is formed by an annular gap which is concentric to the chuck axis.

Accordingly, on the tool-side end of the expanding clutch, an expansion bushing is provided to hold and chuck a tool. To generate a pressure that hydraulically deforms this expansion bushing, the expansion chuck has a pressure generating unit which is offset axially with respect to the expansion bushing and the pressure chamber that surrounds it. To transmit the applied pressure over the axial distance between the pressure chamber and the pressure generating unit, the expansion chuck has a pressure conducting system, which at least one possible embodiment teaches is realized in the form of a closed, ring-shaped gap or channel which is concentric with the axis of the expansion chuck. The pressure chamber is thereby extended by or through the pressure conducting system, in particularly continuously axially toward the pressure generating unit.

Compared to the use of a conventional boring as the pressure conduction system, an annular gap with a comparable cross section surface area has a radial dimension that is generally significantly smaller. An annular gap with a cross section surface area that is sufficient to transmit the pressure can therefore be located in a space-saving manner even in an extremely narrow expansion chuck. When pressure is applied into the material of the expansion chuck, the stresses that are introduced in the vicinity of the annular pressure conduction system are also always rotationally symmetrical with reference to the axis of the expansion chuck, so that essentially no asymmetrical deformation of the expansion chuck can occur and thus the true or concentric running of the expansion chuck is essentially not adversely affected in operation.

A ring-shaped and concentric pressure conduction system can be realized particularly easily by a two-part construction of the expansion chuck. According to at least one possible embodiment, the expansion chuck comprises a central base body which carries on its tool-side end the expansion chuck, and on the tool-side end a chucking sleeve which is drawn onto the base body. As a result of the coordinated sizing of the inside diameter of the chucking sleeve and the outside diameter of the base body, an annular gap is thereby formed between the base body and the chucking sleeve which forms the pressure chamber and the pressure conduction system that is axially adjacent to it. For purposes of a simple and stable construction, at least one possible embodiment teaches that the base body and the chucking sleeve are preferably connected to each other in a manner that is rigid and pressure-tight, in particular by hard soldering.

A geometry of the expansion chuck that is advantageous in terms of a space-saving design is achieved by locating the pressure generating unit in the chucking sleeve. A pressure generating unit with a piston/cylinder system is advantageous both with regard to ease of manufacture as well as with regard to ease of handling of the expansion chuck. This piston/cylinder system comprises a compression piston which is guided in a cylinder bore or in a sleeve that can optionally be inserted into a cylinder bore. A simple filling of the pressure chamber, of the pressure conduction system and of the pressure generating system with the pressure fluid is achieved by a filling boring that is bent at an angle with respect to the cylinder bore and connects the cylinder bore with the pressure conduction system. In one particularly simple and effective realization, the compression piston can be actuated by means of a tightening screw.

In one form of the expansion chuck that is advantageous in particular for the construction of molds and dies, the chucking sleeve transitions on the tool side into a long, narrow neck region, the axial length of which is at least four times its outside diameter. The length of this neck area is in particular at least 100 mm.

One particular advantage of the expansion chuck claimed by at least one possible embodiment is that it becomes possible with comparatively little effort and expense to achieve a very narrow tool holder, which is defined by the inside diameter of the expansion bushing. For example, the inside diameter of the expansion bushing is preferably 12 mm, although it can also be significantly smaller or larger. To chuck such thin tools on conventional expansion chucks, it is frequently necessary to use a reducer piece for the tool that can be inserted into the receptacle of the expansion chuck. The use of this reducing piece can have a disadvantageous effect on the true or concentric running of the tool.

To achieve an efficient chucking action of the expansion chuck, at least one possible embodiment teaches that it is advantageous to keep the total volume of the overall pressure system, i.e. of the pressure chamber, of the pressure conduction system and of the pressure generating device, as small as possible. According to at least one possible embodiment, this smallest possible total volume is achieved by making the radial dimension of the annular gap that forms the pressure conduction system and the pressure chamber very small. It is advantageous if the radial dimension of the annular gap is a maximum of 0.2 mm, preferably approximately 0.1 mm. This extremely narrow realization of the annular gap is also space-saving and is therefore advantageous with regard to particularly slim realizations of the expansion chuck.

The annular shape of the pressure conduction system creates space in the central area of the expansion chuck, which can consequently be used advantageously for other purposes. According to one possible embodiment, for example, the base body is provided with a central passage which can be used as a coolant channel, for example.

According to another possible embodiment, an axial adjustment unit for the tool is provided which is also preferably located in the central area of the expansion chuck. In one advantageous configuration, this axial adjustment device comprises an adjustment pin which can be adjusted axially with respect to the base body and acts as an axial stop for the tool to be chucked, and is preferably guided in a central boring of the base body.

In one constructively particularly simple realization, the adjustment pin can be adjusted axially in the base body in the manner of a screw. For this purposes, the adjustment pin is provided with a male thread which interacts with a female thread of the central boring of the base body.

In one variant which is particularly advantageous from an operational point of view, the adjustment pin can be adjusted by means of a radially accessible set screw so that the axial adjustment can be made even when the tool has already been inserted. The set screw, which is preferably guided in the base body, is thereby provided on its inner end with a helical thread which meshes with an axial-linear gearing of the adjustment pin.

The above-discussed embodiments of the present application will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Embodiments of the present application are explained in greater detail below with reference to the accompanying drawings, in which.

Parts and dimensions that are the same in all figures are identified with the same reference numbers.

DESCRIPTION OF EMBODIMENT OR EMBODIMENTS

Figure 1:
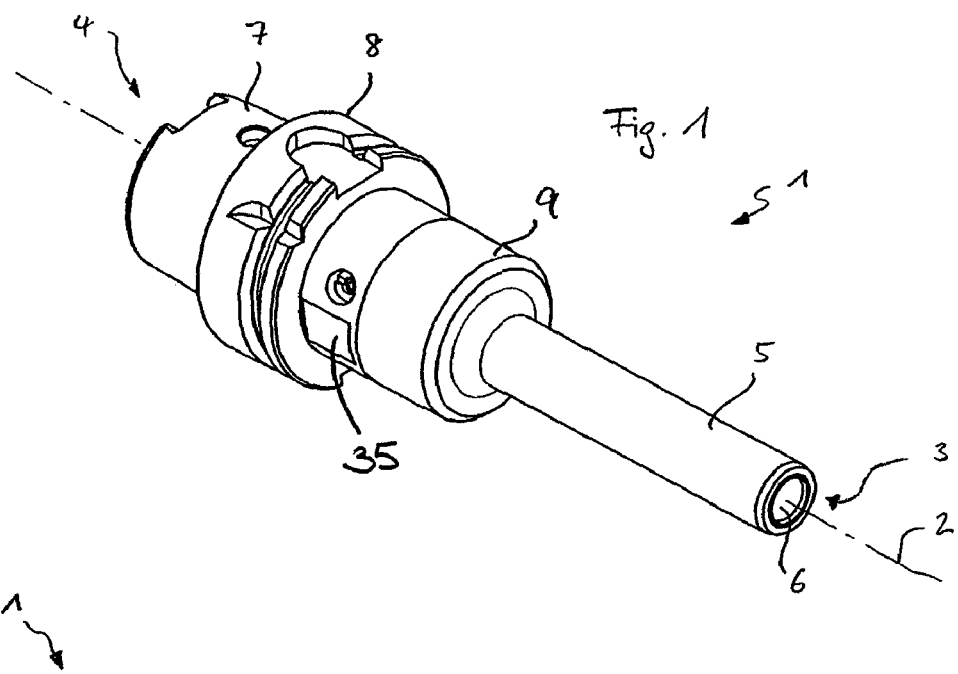
FIG. 1 is a view in perspective of a hydraulic expansion chuck for chucking a tool.
Figure 2:
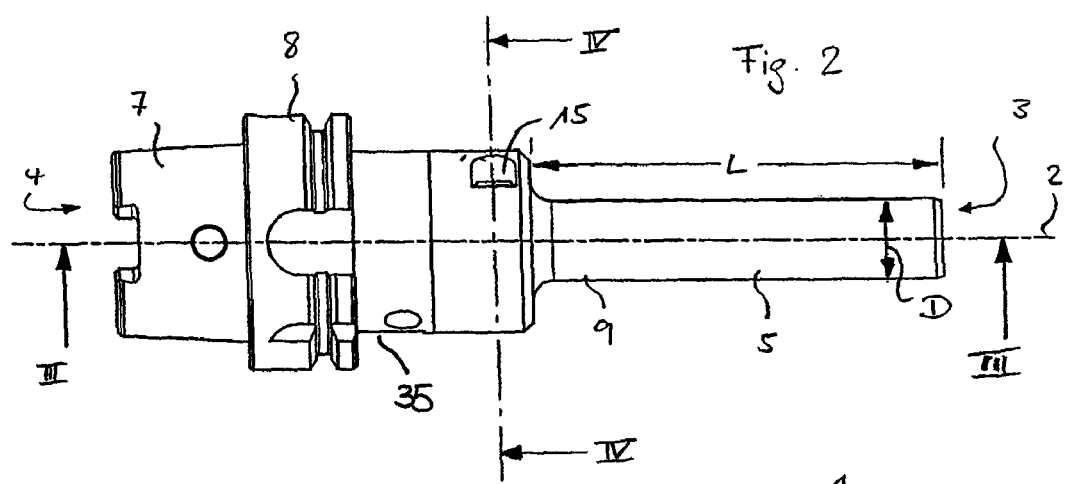
FIG. 2 is a side view of the expansion chuck illustrated in FIG. 1.

The hydraulic expansion chuck illustrated in various views in FIGS. 1 to 4 (and called "expansion chuck 1" below for short) is used to chuck a rotational tool (not shown), in particular a boring tool or milling cutter, onto the drive spindle of a machine tool (also not shown). The expansion chuck 1 is essentially rotationally symmetrical with respect to the expansion chuck axis 2 that forms the axis of rotation and, viewed in the direction of this expansion chuck axis 2, has a tool-side end 3 and a machine-side end 4. In the vicinity of the tool-side end 3 the expansion chuck 1 is drawn out into a long, narrow neck area 5, which on its free end has a receptacle 6 for the tool. The axial length L of the neck area 5 is thereby four to five times greater than the outside diameter D. In the preferred sizing, the length L is 100 mm for an outside diameter of 20 mm and an inside diameter d of the receptacle 6 of 12 mm. However, an even longer and/or narrower shape of the expansion chuck 1 or an even smaller inside diameter d can also be realized. The machine-side end 4 is provided with a fastening cone 7, e.g. realized in the form of an HSK (hollow shaft cone) shank, to connect the expansion chuck 1 to the drive spindle.

The expansion chuck 1 is essentially constructed in two parts and comprises a central base body 8, on the tool-side area of which an approximately bell-shaped chucking sleeve 9 is placed. The base body 8 and the chucking sleeve 9 are hard-soldered to each other both on the tool side and on the machine side, and are thus connected by a rigid and pressure-tight connection.

Figure 3:
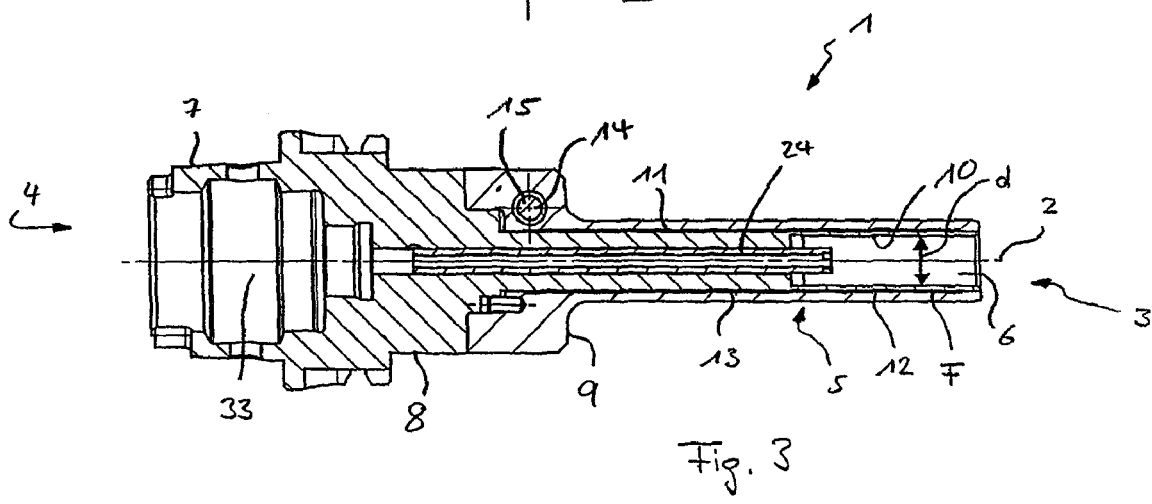
FIG. 3 is a longitudinal section along line III-III of the expansion chuck illustrated in FIG. 2.

In the vicinity of the receptacle 6, the base body 8 is realized in the form of a thin-walled hollow cylinder. This thin-walled area of the base body 8 is called the expansion bushing 10. The expansion bushing 10 is preferably realized in one piece with the base body 8, although it can also be formed by a separate part. Between the inside wall of the chucking sleeve 9 and the facing outer wall of the base body 8, in the neck area 5, there is an annular gap 11. This annular gap 11 has only one extremely small radial dimension R of preferably 0.1 mm (which is equal to approximately one-tenth of the wall thickness of the expansion bushing 10) and is therefore shown, on account of the relative sizes, only in the enlarged FIG. 4, and in FIG. 4 it is best illustrated in an even further enlarged detail A. In FIG. 3, the annular gap 11 is visible only as a thick black line, and is shown only for purposes of illustration.

The annular gap 11 extends in the axial direction over a majority of the length of the chucking sleeve 9 and in the vicinity of the receptacle 6 forms a pressure chamber 12, which holds a liquid pressure fluid F, in particular an oil. The area of the annular gap 11 which extends toward the machine-side end 4 beyond the pressure chamber 12 forms a pressure conducting system 13 which forms a fluid connection with a pressure generating unit 14 which is axially offset in relation to the pressure chamber 12 and thus makes possible a transmission of pressure from the pressure generating device 14 into the pressure chamber 12. In the unloaded condition, the radial dimension R is essentially equal over the entire length of the annular gap 11, so that the pressure chamber 12 makes a continuous transition into the pressure conduction system 13.

Figure 4:
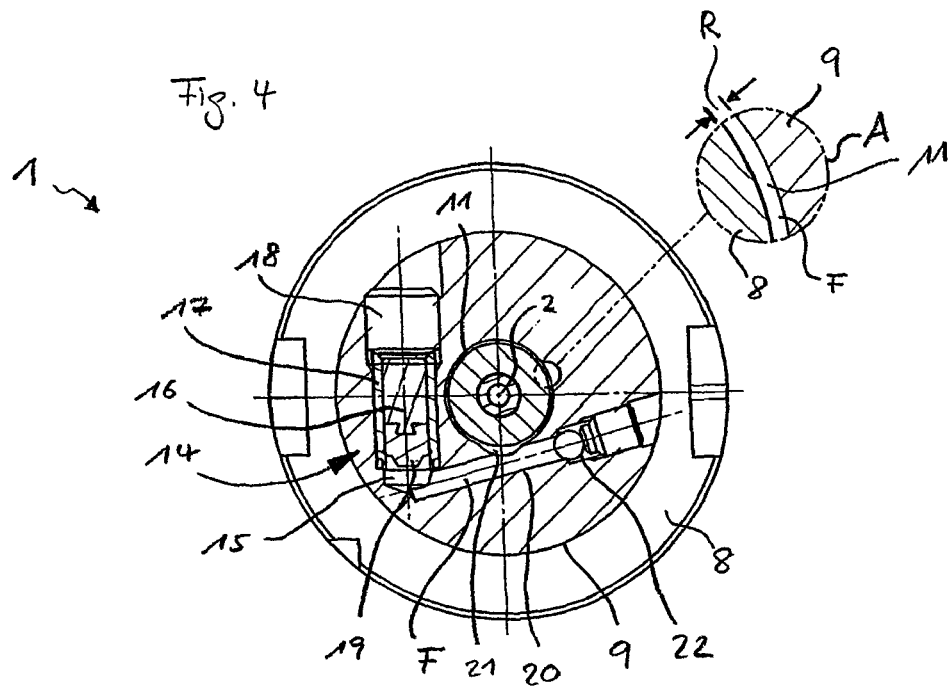
FIG. 4 is a cross section along line IV-IV of the expansion chuck illustrated in FIG. 2.

As shown in particular in FIG. 4, the pressure generating unit 14 comprises a cylinder bore 15 in which a pressure piston 16 is located. The pressure piston 16 is adjustably guided either directly in the cylinder bore 15 or—as shown in FIG. 4—in a sleeve 17 that is inserted into the cylinder bore 15. The pressure piston 16 is actuated by means of a tightening screw 18. The inner end of the pressure piston 16 carries a seal 19 which is made of an elastic material, in particular a rubber elastomer. The pressure generating device 14 further comprises a filling boring 20 which runs at an angle from the inner end of the cylinder bore 15 so that it is approximately tangent to the annular gap 11. The filling boring 20 is therefore in hydraulic communication both with the cylinder bore 15 and, via a connecting groove 21, with the annular gap 11. The filling boring 20 is closed pressure-tight from the atmosphere by a ball seat 22.

Before the startup of the expansion chuck 1, first the combined volume of the pressure cylinder 15, the filling boring 20, and the annular gap 11 is completely filled with the fluid medium F by means of the opened filling boring 20. To prevent air bubbles from getting into the pressure system, this filling is performed under a vacuum. After the filling, the filling boring is closed pressure-tight by the ball seat 22. For the chucking of a tool that is inserted into the receptacle, a screwdriver can then be used to adjust the tightening screw 18 and thus the pressure piston 16 in the cylinder bore 15 so that the volume of the cylinder bore 15 filled with the pressure fluid F is reduced in size. As a result of this adjustment, a hydrostatic pressure of typically up to 1000 bar can be applied to the pressure fluid F. This pressure is transmitted via the annular gap 11 as the pressure conduction system 13 to the vicinity of the pressure chamber 12. Here, the hydrostatic pressure causes a deformation of the thin-walled expansion busing 10 radially inward toward the expansion chuck axis 2, as a result of which the tool is chucked in the receptacle 6. On the other hand, on account of the relatively large wall thickness of the expansion sleeve 9 that acts as the boundary for the pressure chamber 12 on the outside, no significant deformation by the action of the pressure occurs on the outer periphery of the expansion chuck 1.

To remove the tool from the expansion chuck 1, the pressure piston 16 is retracted by a few rotations of the tightening screw 18, as a result of which the pressure of the pressure fluid F is reduced. The elastically deformed expansion chuck 10 thereby resumes its original shape so that the tool can be removed.

Figure 5:
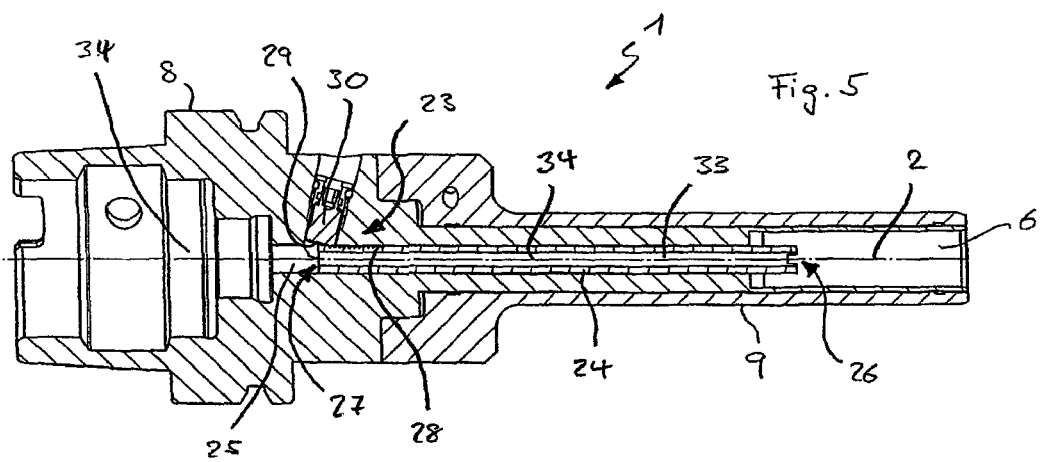
FIG. 5 is a longitudinal section, rotated around the axis of the expansion chuck with respect to FIG. 3, of the expansion chuck illustrated in FIG. 2.

The expansion chuck 1 further comprises an axial adjustment unit 23 for the tool, which is particularly easily visible in FIG. 5, which is a longitudinal view that is rotated with respect to FIG. 3. The axial adjustment 23 comprises an adjusting pin 24 which is approximately in the shape of a hollow cylinder and is guided so that it can slide in a central boring 25 of the base body 8. The tool-side end 26 of the adjusting pin 24 thereby projects into the receptacle and thus forms an axial stop for the tool to be inserted into the receptacle 6. To be able to adjust the adjusting pin 24 and thus the stop for the tool in the axial direction, the adjusting pin 24 is provided near its machine-side end 27 with an axial-linear gearing 28. This gearing 28 meshes with a helical thread 29 which is attached on the end side to a set screw 30 which is guided in the base body 8 essentially radially with reference to the expansion chuck axis 2. One advantage of this construction is that the radial set screw 30 is accessible even when the tool is inserted in the receptacle 6.

Figure 6:
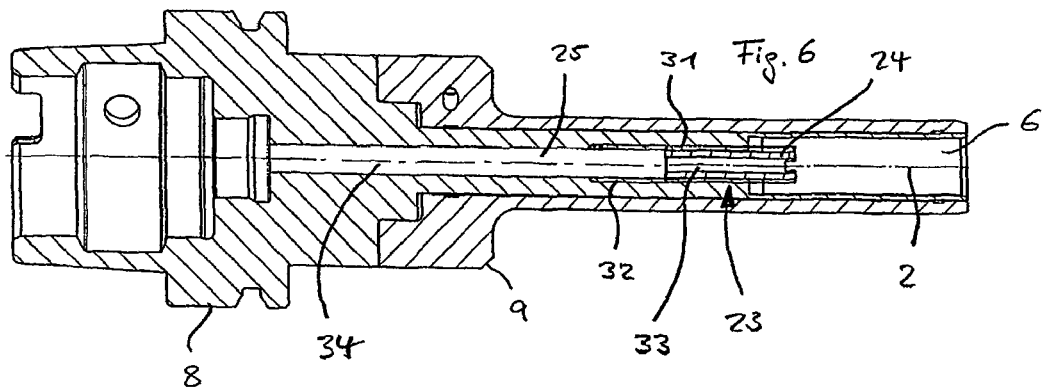
FIG. 6 is a view of the expansion chuck illustrated in FIG. 5 with an alternative axial adjustment unit for the tool to be chucked.

In a constructively simplified variant of the axial adjustment 23 illustrated in FIG. 6, the adjusting pin 24 is provided with a male thread 31 which corresponds to a female thread 32 of the boring 25. In this embodiment, the adjusting pin 24 can be adjusted by means of a screwdriver introduced into the receptacle 6.

Along the expansion chuck axis 2 in both of the embodiments of the expansion chuck 1 described above, a passage 34 is formed by the boring 25 and an aligned boring 33 of the adjusting pin 24. The passage 34 can be used as, among other things, a coolant channel, through which, during the operation of the machine tool, coolant can be conducted into the area of the receptacle 6 and thus into the vicinity of the tool.

On the periphery of the base body 8 there is also a counterbalance surface 35, i.e. a carefully calculated surface that is machined to preserve the axial symmetry of the base body, by means of which any imbalance produced by the asymmetrical pressure generating unit 14 can be precisely compensated. In this manner, during the operation of the expansion chuck 1, even at relatively high speeds of rotation, a highly accurate concentric running can be achieved, which is of particular importance given the long, narrow construction. Instead of the machined counterbalance area 35, a counterweight screw that is screwed to the base body 8 can also be used, and/or there can be one or more counterweight discs or other machined areas or borings.

At least one possible embodiment relates to a hydraulic expansion chuck 1 which has a particularly advantageous long, narrow design. The tool end 3 of the expansion chuck 1 is equipped with an expansion bushing 1 that is surrounded by a pressure chamber 12 which can be radially deformed in order to clamp a tool by means of a hydraulic fluid F that is contained in said pressure chamber 12. A pressure generation unit 14 is situated at an axial distance from the expansion bushing 10 and a pressure conduction system 13 is provided to transfer pressure from the pressure generation unit 14 to the pressure chamber 12, said pressure conduction system being formed by an annular gap 11 that is concentric with the chuck axis 2.

One feature or aspect of an embodiment is believed at the time of the filing of this patent application to possibly reside broadly in a hydraulic expansion chuck 1 with an expansion bushing 10 on its tool-side end 3 and surrounded by a pressure chamber, which expansion bushing 1 can be deformed radially under the action of a pressure fluid (F) that is contained in the pressure chamber 12 to chuck a tool, with a pressure generating unit 14 that is at some distance axially with respect to a chuck axis 2 of the expansion bushing 10 and a pressure conduction system 13 for the transmission of pressure from the pressure generating unit 14 to the pressure chamber 12, characterized in that the pressure conduction system 13 is formed by an annular gap 11 which is concentric to the chuck axis 2.

Another feature or aspect of an embodiment is believed at the time of the filing of this patent application to possibly reside broadly in the expansion chuck 1, wherein a base body 8 that is central with respect to the chuck axis 2, carries the expansion bushing 1 and a chucking sleeve 9 that concentrically surrounds the base body 8, whereby the pressure chamber 12 and the pressure conduction system 13 are formed between the base body 8 and the chucking sleeve 9.

Yet another feature or aspect of an embodiment is believed at the time of the filing of this patent application to possibly reside broadly in the expansion chuck 1, wherein the base body 8 and the chucking sleeve 9 are connected to each other rigidly and pressure-tight.

Still another feature or aspect of an embodiment is believed at the time of the filing of this patent application to possibly reside broadly in the expansion chuck 1, wherein the pressure generating unit 14 is located in the chucking sleeve 9.

A further feature or aspect of an embodiment is believed at the time of the filing of this patent application to possibly reside broadly in the expansion chuck 1, wherein the pressure generating unit 14 comprises a cylinder bore 15 with an adjustable pressure piston 16 located in it and a filling boring 20, which connects the cylinder bore 15 with the pressure conduction system 13.

Another feature or aspect of an embodiment is believed at the time of the filing of this patent application to possibly reside broadly in the expansion chuck 1, wherein the pressure piston 16 can be adjusted by means of a tightening screw 18.

Yet another feature or aspect of an embodiment is believed at the time of the filing of this patent application to possibly reside broadly in the expansion chuck 1, wherein the chucking sleeve 9, on its tool-side, has a long, narrow neck area 5, the axial length L of which is at least four times its outside diameter (D).

Still another feature or aspect of an embodiment is believed at the time of the filing of this patent application to possibly reside broadly in the expansion chuck 1, wherein the axial length of the neck area (L) is at least 100 mm.

A further feature or aspect of an embodiment is believed at the time of the filing of this patent application to possibly reside broadly in the expansion chuck 1, wherein the radial dimension (R) of the annular gap 11 is a maximum of 0.2 mm.

Another feature or aspect of an embodiment is believed at the time of the filing of this patent application to possibly reside broadly in the expansion chuck 1, wherein the base body 8 has a central passage 34.

Another feature or aspect of an embodiment is believed at the time of the filing of this patent application to possibly reside broadly in the expansion chuck 1 comprises an axial adjustment unit 23.

Still another feature or aspect of an embodiment is believed at the time of the filing of this patent application to possibly reside broadly in the expansion chuck 1, wherein the axial adjustment unit 23 comprises an adjusting pin 24 that is axially adjustable with respect to the base body 8 and forms an axial stop for the tool.

A further feature or aspect of an embodiment is believed at the time of the filing of this patent application to possibly reside broadly in the expansion chuck 1, wherein the adjusting pin 24 is guided in a central boring 25 of the base body 8.

Yet another feature or aspect of an embodiment is believed at the time of the filing of this patent application to possibly reside broadly in the expansion chuck 1, wherein the adjusting pin 24 is provided with a male thread 31 which interacts with a female thread 32 of the boring 25 for the axial adjustment of the adjusting pin 24.

Still another feature or aspect of an embodiment is believed at the time of the filing of this patent application to possibly reside broadly in the expansion chuck 1, wherein the adjusting pin 24 has an axial-linear gearing 28 which interacts with a helical thread 29 of a set screw 30 that is guided essentially radially with reference to the chuck axis 2 in the base body 8 for the axial adjustment of the adjusting pin 24.

A further feature or aspect of an embodiment is believed at the time of the filing of this patent application to possibly reside broadly in the expansion chuck 1, wherein a counterbalance surface 35 that is machined into a peripheral area to compensate for any imbalance caused by the pressure generating unit 14.

The components disclosed in the various publications, disclosed or incorporated by reference herein, may possibly be used in possible embodiments of the present application, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the present application, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search report for International Application No. PCT/EP2005/003048, and/or cited elsewhere are hereby incorporated by reference as if set forth in their entirety herein as follows: U.S. Pat. No. 6,179,530; EP0991872; DE9411260U; DE9305704U; WO9846896; WO9529029; WO9839123; and WO02070177.

The corresponding foreign and international patent publication applications, namely, Federal Republic of Germany Patent Application No. 20 2004 005 321.7, filed on Apr. 3, 2004, having inventor Josef K. Herud, and DE-OS 20 2004 005 321.7 and DE-PS 20 2004 005 321.7, and International Application No. PCT/EP2005/003048, filed on Mar. 22, 2005, having WIPO Publication No. WO 2005/097383 A1 and inventor Josef K. Herud, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the present application described herein above in the context of the preferred embodiments are not to be taken as limiting the embodiments of the present application to all of the provided details thereof, since modifications and variations thereof may be made without departing from the spirit and scope of the embodiments of the present application.

AT LEAST PARTIAL NOMENCLATURE 1 (Hydraulic) expansion chuck
2 Expansion chuck axis
3 (Tool-side) end
4 (Machine-side) end
5 Neck area
6 Receptacle
7 Fastening cone
8 Base body
9 Chucking sleeve
10 Expansion bushing
11 Annular gap
12 Pressure chamber
13 Pressure conduction system
14 Pressure generating unit
15 Cylinder bore
16 Pressure piston
17 Bushing
18 Tightening screw
19 Seal
20 Filling boring
21 Connecting groove
22 Ball seat
23 Axial adjustment unit
24 Adjusting pin
25 Boring
26 (Tool-side) end
27 (Machine-side) end
28 Gearing
29 Helical thread
30 Set screw
31 Male thread
32 Female thread
33 Boring
34 Passage
35 Counterbalance surface
L Length
D Outside diameter
d Inside diameter
F Pressure fluid
A Detail

What is claimed is:

1. A hydraulic expansion chuck for a chucking a tool such as a boring tool, a milling cutter, or other cutting tool, said hydraulic expansion chuck comprising:
    a central longitudinal axis about which said chuck is to be rotated;
    a tool-side end at which a tool is held;
    a machine-side end at which said expansion chuck is to be connected to a machine for imparting rotational force to said expansion chuck to rotate said expansion chuck;
    said machine-side end being disposed opposite said tool-side end;
    a base body being disposed concentrically with respect to said central longitudinal axis;
    said base body comprising:
        a receptacle portion being disposed at said machine-side end and being configured to receive a drive spindle of a machine for imparting rotational force to said expansion chuck; and
        a shank-holding portion being disposed at said tool-side end and being configured to receive a shank of a tool;
    said shank-holding portion comprising an expansion bushing being configured to receive and hold a shank of a tool therein;
    a pressure chamber being configured and disposed to surround said expansion bushing;
    said pressure chamber being configured and disposed to hold a pressure fluid therein;
    said pressure chamber being configured and disposed to be pressurized to radially deform said expansion bushing to clamp and hold a shank of a tool disposed therein to chuck the tool;
    a pressure generating unit being disposed a distance axially away from said central longitudinal axis;
    an annular gap being disposed concentrically with respect to said central longitudinal axis;
    said annular gap being configured and disposed to connect said pressure generating unit and said pressure chamber to permit the transmission of pressure from said pressure generating unit to said pressure chamber;
    said expansion chuck comprises a chucking sleeve disposed concentrically about said shank-holding portion of said base body; and
    said base body and said chucking sleeve together form said annular gap and said pressure chamber.

2. The expansion chuck according to claim 1, wherein said base body and said chucking sleeve are connected to each other rigidly and pressure-tight.

3. The expansion chuck according to claim 2, wherein said pressure generating unit is disposed in said chucking sleeve.

4. The expansion chuck according to claim 3, wherein said pressure generating unit comprises:
    a cylinder bore;
    an adjustable pressure piston disposed in said cylinder bore;
    a filling boring configured and disposed to connect said cylinder bore and said annular gap;
    a tightening screw; and
    said pressure piston is configured to be adjusted by said tightening screw.

5. The expansion chuck according to claim 4, wherein:
    said chucking sleeve comprises an elongated neck portion at said tool-side end; and said neck portion has an axial length of at least 100 mm, which is at least four times the outside diameter of said neck portion.

6. The expansion chuck according to claim 5, wherein:
said annular gap has a radial dimension of at most 0.2 mm; and
said base body comprises a central passage disposed to run through said receptacle portion and said shank-holding portion.

7. The expansion chuck according to claim 6, wherein:
said expansion chuck comprises an axial adjustment unit for adjusting the insertion depth of a shank of a tool inserted in said expansion chuck;
said axial adjustment unit comprises an adjusting pin that is axially adjustable with respect to said base body and forms an axial stop for a shank of a tool inserted in said expansion chuck; and
said central boring of said base body comprises a central boring portion in which said adjusting pin is guided.

8. The expansion chuck according to claim 7, wherein:
said adjusting pin comprises a male threaded portion;
said central boring portion comprises a female threaded portion;
said male threaded portion of said adjusting pin is configured and disposed to engage with said female threaded portion of said central boring portion for the axial adjustment of said adjusting pin; and
said base body comprises a counterbalance surface machined into a peripheral area to compensate for imbalances caused by said pressure generating unit.

9. The expansion chuck according to claim 7, wherein:
said expansion chuck comprises a set screw disposed essentially radially with respect to said central longitudinal axis in said receptacle portion of said base body;
said set screw comprises a helical thread;
said adjusting pin comprises an axial-linear gearing configured and disposed to engage with said helical thread of said set screw for the axial adjustment of said adjusting pin; and
said expansion chuck comprises a counterbalance surface machined into a peripheral area to compensate for imbalances caused by said pressure generating unit.

10. The expansion chuck according to claim 1, wherein:
said pressure generating unit is disposed in said chucking sleeve;
said pressure generating unit comprises:
a cylinder bore disposed completely within said chucking sleeve and to run beside said annular gap in a direction substantially parallel to a tangent of said annular gap;
an adjustable pressure piston disposed in said cylinder bore;
a filling boring disposed within said chucking sleeve and to run in a direction substantially parallel to a tangent of said annular gap;
said filling boring is configured and disposed to connect said cylinder bore and said annular gap;
a tightening screw; and
said pressure piston is configured to be adjusted by said tightening screw.

11. The expansion chuck according to claim 10, wherein said shank-holding portion is elongated and has an outermost outside diameter smaller than a smallest outside diameter of said receptacle portion.

12. The expansion chuck according to claim 11, wherein:
said chucking sleeve comprises a body portion connected to said base body and an elongated neck portion extending from said body portion toward said tool-side end;
said elongated neck portion has an outside diameter than an outside diameter of said body portion of said chucking sleeve; and
said neck portion has an axial length of at least 100 mm, which is at least four times the outside diameter of said neck portion.

13. The expansion chuck according to claim 12, wherein:
said annular gap has a radial dimension of at most 0.2 mm; and
said base body comprises a central passage disposed to run through said receptacle portion and said shank-holding portion.

14. The expansion chuck according to claim 13, wherein:
said expansion chuck comprises an axial adjustment unit for adjusting the insertion depth of a shank of a tool inserted in said expansion chuck;
said axial adjustment unit comprises an adjusting pin that is axially adjustable with respect to said base body and forms an axial stop for a shank of a tool inserted in said expansion chuck; and
said central boring of said base body comprises a central boring portion in which said adjusting pin is guided.

15. The expansion chuck according to claim 14, wherein:
said adjusting pin comprises a male threaded portion;
said central boring portion comprises a female threaded portion;
said male threaded portion of said adjusting pin is configured and disposed to engage with said female threaded portion of said central boring portion for the axial adjustment of said adjusting pin; and
said base body comprises a counterbalance surface machined into a peripheral area to compensate for imbalances caused by said pressure generating unit.

16. The expansion chuck according to claim 14, wherein:
said expansion chuck comprises a set screw disposed essentially radially with respect to said central longitudinal axis in said receptacle portion of said base body;
said set screw comprises a helical thread;
said adjusting pin comprises an axial-linear gearing configured and disposed to engage with said helical thread of said set screw for the axial adjustment of said adjusting pin; and
said expansion chuck comprises a counterbalance surface machined into a peripheral area to compensate for imbalances caused by said pressure generating unit.

17. The expansion chuck according to claim 1, wherein said shank-holding portion is elongated and has an outermost outside diameter smaller than a smallest outside diameter of said receptacle portion.

18. The expansion chuck according to claim 17, wherein:
said chucking sleeve comprises a body portion connected to said base body and an elongated neck portion extending from said body portion toward said tool-side end;
said elongated neck portion has an outside diameter than an outside diameter of said body portion of said chucking sleeve; and
said neck portion has an axial length of at least 100 mm, which is at least four times the outside diameter of said neck portion;
said annular gap has a radial dimension of at most 0.2 mm;
said base body comprises a central passage disposed to run through said receptacle portion and said shank-holding portion;

said expansion chuck comprises an axial adjustment unit for adjusting the insertion depth of a shank of a tool inserted in said expansion chuck;

said axial adjustment unit comprises an adjusting pin that is axially adjustable with respect to said base body and forms an axial stop for a shank of a tool inserted in said expansion chuck; and said central boring of said base body comprises a central boring portion in which said adjusting pin is guided.

19. The expansion chuck according to claim 18, wherein:

said adjusting pin comprises a male threaded portion;

said central boring portion comprises a female threaded portion;

said male threaded portion of said adjusting pin is configured and disposed to engage with said female threaded portion of said central boring portion for the axial adjustment of said adjusting pin; and said base body comprises a counterbalance surface machined into a peripheral area to compensate for imbalances caused by said pressure generating unit.

20. The expansion chuck according to claim 19, wherein:

said expansion chuck comprises a set screw disposed essentially radially with respect to said central longitudinal axis in said receptacle portion of said base body;

said set screw comprises a helical thread;

said adjusting pin comprises an axial-linear gearing configured and disposed to engage with said helical thread of said set screw for the axial adjustment of said adjusting pin; and said expansion chuck comprises a counterbalance surface machined into a peripheral area to compensate for imbalances caused by said pressure generating unit.

\* \* \* \* \*